Jan. 7, 1930.  E. J. QUINN  1,743,047
BUMPER
Filed June 15, 1928
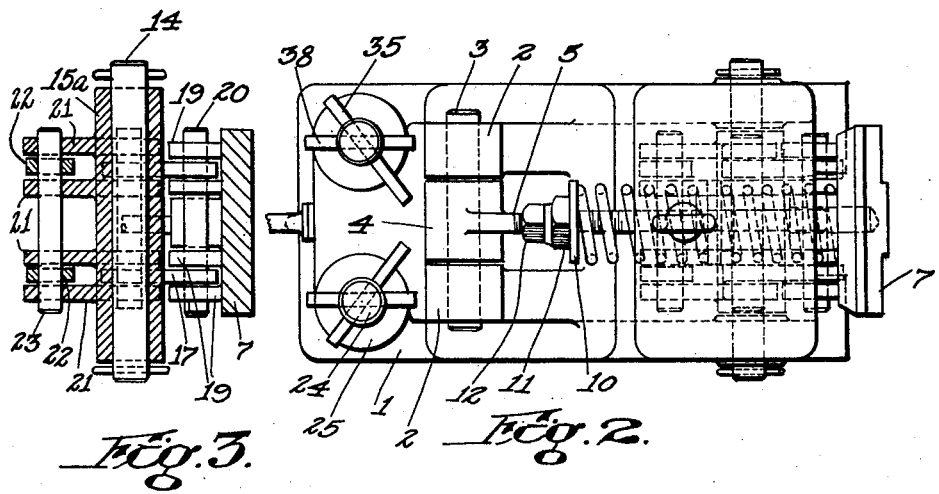
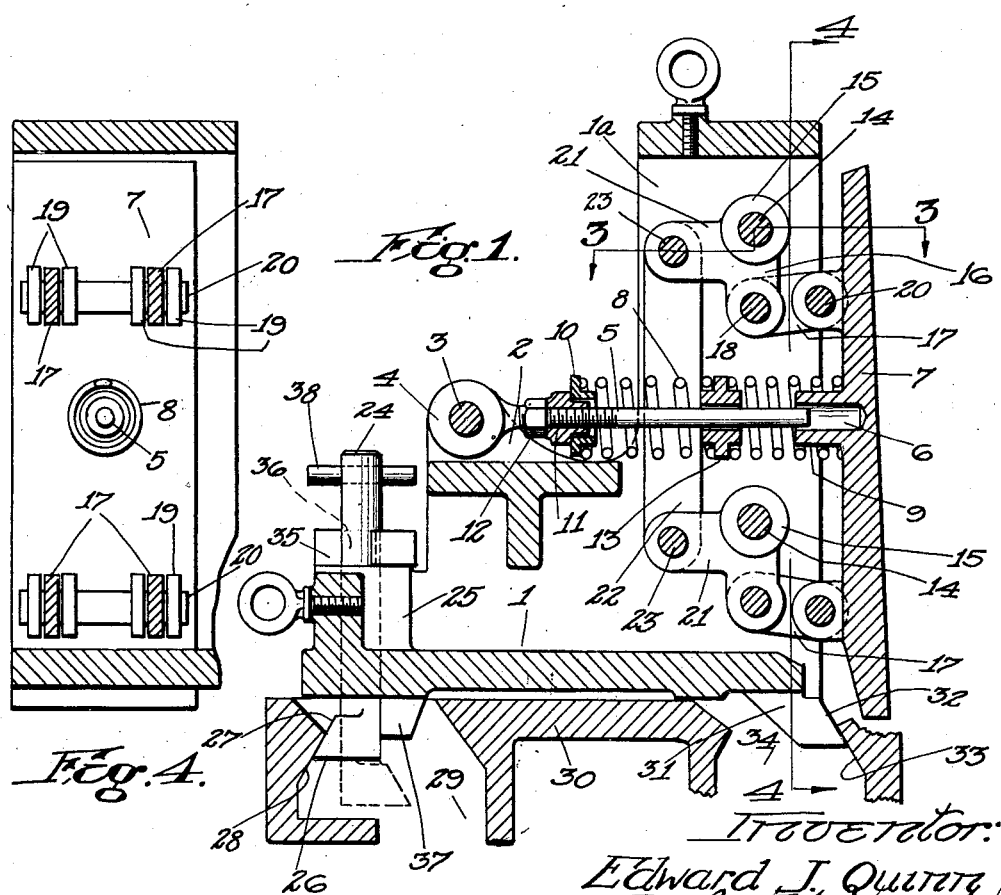
Inventor:
Edward J. Quinn
By Geo. H. Kennedy
Attorney Patented Jan. 7, 1930

1,743,047

UNITED STATES PATENT OFFICE

EDWARD J. QUINN, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS

BUMPER

Application filed June 15, 1928. Serial No. 285,759.

The present invention relates to bumpers of the type employing a resiliently supported member for arresting the motion of a moving object and absorbing the energy thereof, without destructive shock or damage to the object whose motion is arrested, or to the bumper itself.

The purpose of my invention is to provide an improved bumper that is particularly adapted to receive the shocks of objects striking the bumper in different places. It is a comparatively simple matter to design a bumper for receiving, always at the same place the impact of a moving object or objects, it only being necessary to place the resilient member for absorbing the shock in substantial alinement with the centers of gravity of the moving objects; but such an elementary type of bumper is not effective when moving objects strike it at different places or levels. Such a condition is met with when a bumper is employed to arrest the motion of heavy metal bars or flats as successively run out from a rolling mill and piled one upon the other, for with such a use it is obvious that the pieces of metal will strike the bumper at a succession of different levels, and that in a bumper of ordinary construction there can be no single position of the shock-absorbing spring that will give uniform absorption of all the blows.

According to my invention I provide a bumper that is particularly adapted for use under conditions where a large number of moving objects strike the bumper at different places or levels, as described above. The principle underlying my invention resides in mounting the member which receives the blows in such a manner that the shock-receiving member, when yielding in response to a blow, always remains parallel to its original position. With such a mounting of the shock-receiving member, the resistance offered by the bumper remains uniform and the shocks absorbed by the spring are symmetrical with respect to the direction of the force exerted by the spring. The above and other advantageous features of my invention will hereinafter more fully appear, reference being had to the accompanying drawings in which—

Fig. 1 is a vertical sectional view showing the bumper embodying my invention.

Fig. 2 is a plan view of the parts shown in Fig. 1.

Fig. 3 is a horizontal sectional view along the line 3—3 of Fig. 1.

Fig. 4 is a vertical sectional view along the line 4—4 of Fig. 1.

Like reference characters refer to like parts in the different figures.

Referring to the drawings, the bumper comprises a base 1 which provides a pair of lugs 2 for supporting between them a shaft 3. The shaft 3 between the lugs 2, carries the head 4 of a rod 5, the other end of the rod 5 being loosely received in an opening 6 provided in a bumper plate 7.

The plate 7 is normally held extended on the rod 5 in the position shown in Fig. 1 by means of a spring 8 surrounding the rod 5. One end of the spring 8 is received on a boss 9 surrounding the bumper plate opening 6 while the other end of the spring is seated on a guide 10 carried by a nut 11 in threaded engagement with a portion of the rod 5. A second nut 12 serves to lock the guide carrying nut 11 on the rod 5, so as to hold the adjustment of the spring 8, and that portion of the spring 8 between the guide 10 and the boss 9 is prevented from buckling by means of a bushing 13 loosely received on the rod 5.

The plate 7 is held in operative position by its attachment, in the special manner hereinafter described, to a pair of shafts 14, 14 extending between the vertical sides 1ᵃ of the base above and below the spring rod 5.

Each shaft 14 carries a bell crank lever 15, which has an elongated hub 15ᵃ as shown in Fig. 3. From each hub 15ᵃ extend two spaced pairs of downwardly projecting arms 16, between each pair of which is received a link 17 pivotally connected thereto by a pin 18 which extends through all the alined arms 16. The other ends of the links 17 are received between pairs of lugs 19 projecting from the rear of the plate 7, a pin 20 extending through all the alined lugs 19 to connect both links 17 thereto. This construction is carried out for both of the bell-cranks 15, so that the plate 7 is supported at four points substantially symmetrical about the axis of spring rod 5, as shown in Fig. 4.

Each bell crank 15 also provides pairs of spaced arms 21 extending rearwardly, substantially at right angles to the arms 16, and the arms 21 of the upper lever 15 are connected to the arms 21 of the lower lever 15 by means of links 22 received between the pairs of arms 21 and connected thereto by pins 23 at each end.

With the above described arrangement it is apparent that the plate 7 is supported by the shafts 14 and levers 15 in such a manner that any movement of the plate 7 will be parallel to its position as initially determined by the pressure of the spring 8 in holding the plate extended on the rod 5. When the plate 7 is struck a blow, as for example at the bottom portion thereof, the resulting depression of the plate 7 will be transmitted equally to all parts of the plate by the action of the lower lever 15 in turning the upper lever 15 in the same direction and through the same angular displacement, and the same holds true with respect to a blow struck anywhere on the plate 7, either below or above the rod 5. Consequently, the displacement of the plate 7 caused by each blow is transmitted to the spring 8 in a uniform manner and there is no tendency for the plate 7 to tilt one way or the other about the rod 5 as a pivot, as would occur in the absence of the substantially parallel motion linkage which supports the plate 7.

As best shown in Fig. 1, the four links 17 which take the thrust from the bumper plate 7 when it receives a blow, are disposed so that the pair of links above the rod 5 are out of parallelism with the pair of links below the rod 5, said pairs of links being arranged to toe inwardly toward each other. As a result of this toed-in arrangement of the links 17, when the plate 7 is struck a blow by a heavy object considerably above or below the axis of the spring rod 15, the plate will not kick upwardly or downwardly, as might otherwise occur should the links 17 be normally maintained in parallel relation.

The frame 1 carrying the bumper plate is adapted to be secured in position so that it will not be shifted by repeated shocks by means of a pair of wedge bolts 24 received in bosses 25 provided at the end of the frame 1. Each bolt 24 terminates at its lower end in a head 26 providing an inclined surface 27 that is adapted to co-operate with a surface 28 having the same inclination provided on one side of an opening 29 in a supporting plate 30. The forward end of the frame provides downwardly extending feet 31 each providing a surface 32 having an inclination opposite to the inclination of the surface 27 on the bolt heads 26. The surfaces 32 are adapted to co-operate with a surface 33 provided on one side of a second opening 34 in the supporting plate 30.

When setting up the bumper for operation, the frame 1 is moved to position the feet 31 in the opening 34 with the surfaces 32 in engagement with the surface 33 within the opening 34. With the feet 31 initially received in the opening 34, the wedge bolts 24 are lowered into the opening 29 with the heads 26 turned into the dotted line position, to permit the heads to clear the upper edge of the inclined surface 28 within the opening 29. The bolts 24 are then turned and pulled upwardly to bring the wedging surfaces 27 into engagement with the surface 28, after which a wedge 35 is inserted in a slot 36 provided in each bolt 24, the slot 36 extending above the boss 25 when the bolt 24 is raised in the position shown. The wedge 35 is then driven into the slot 36 to draw the bolt 24 further upwardly, the co-operation between the engaged surfaces 27 and 28 then causing the surfaces 32 of the feet 31 to jam tightly against the surface 33 in the forward opening 34. When the wedges 35 have been driven in tightly, it is obvious that the frame 1 will be firmly locked in position on the supporting plate 30 between the opposed wedging surfaces 28 and 33. The frame 1 provides downwardly projecting lugs 37 abutting the bolt heads 26 which prevent the bolt heads 26 from bending back and possibly shearing off when the wedges 35 are driven in.

When it is desired to shift the bumper to a different position, as for example when it is desired to receive the impact of pieces of material of different length, it is a simple matter to loosen the bolts 24 by driving out the wedges 35, whereupon the heads 26 of the bolts 24 will fall away from the wedging surface 28. The bumper may then be moved to another supporting plate 30 and locked into position in the manner previously described. The wedge bolts 24 are prevented from dropping out of the bosses 25 when the frame 1 is moved by means of pins 38 extending through the upper ends of the bolts, the pins 38 also providing convenient means for lifting and turning the bolts 24 into engagement with the wedging surface 28 prior to the insertion of the wedges 35.

From the foregoing it is apparent that by my invention I have provided an improved bumper that is characterized by its ability to impose always the same constant resistance against the shocks of a succession of similar objects striking the bumper plate in different places. This is accomplished without tilting the bumper plate, because the parallel linkage for supporting the bumper plate functions to always maintain the bumper plate parallel to its original position, regardless of the distance of the point of application of the blow from the point of contact of the shock absorbing spring. This characteristic of uniform resistance is especially advantageous in the piling up of hot metal bars, one upon the other, as run out successively from a rolling mill; heretofore, in such piling operations, using bumpers of ordinary construction, a part of the bars, encountering normal resistance, would be piled properly, but others encountering excessive resistance, would have their front ends bent and distorted.

I claim:

1. A bumper comprising a shock receiving member yieldingly supported and adapted to offer the same resistance to blows received from moving objects, regardless of the points of application of said blows.

2. A bumper comprising a frame supporting spaced parallel shafts, a shock receiving member connected to said shifts by linkage and a shock absorbing member engaging said shock receiving member between said shafts whereby movements of said shock receiving member by forces applied at points removed from the axis of the shock absorbing member are transmitted to the shock absorbing member in the same manner.

3. In a bumper, the combination with an impact-receiving member of extended area, adapted to receive the blows from moving objects at a plurality of different points, of a spring operating substantially centrally of said member to cushion said blows, and a parallel motion linkage for the support of said member.

4. In a bumper, the combination with an impact-receiving member of extended area, adapted to receive the blows from moving objects at a plurality of different points, of a spring operating substantially centrally of said member to cushion said blows, and a parallel motion linkage for the support of said member from points on opposite sides of said spring.

5. In a bumper, the combination with an impact-receiving member of extended area, adapted to receive the blows from moving objects at a plurality of different points, of a spring operating substantially centrally of said member to cushion said blows, and means for maintaining said member, in yielding to the impact of each blow, in substantial parallelism with its normal position irrespective of the point in its extended area at which the blow is received.

6. In a bumper, the combination with an impact-receiving member of extended area, adapted to receive the blows from moving objects at a plurality of different points, of a spring operating substantially centrally of said member to cushion said blows, and means for maintaining said member, in yielding to the impact of each blow, in substantial parallelism with its normal position, irrespective of the distance of said blow from the line of thrust of said spring.

7. A bumper unit adapted for detachable connection to an apertured support, the base of said unit providing at one end a stationary wedge surface and at the other end a movable wedge surface for cooperation with corresponding undercut surfaces in the apertures of said support.

8. A bumper unit adapted for detachable connection to an apertured support, the base of said unit providing at one end a stationary wedge surface and at the other end a rotatable wedge bolt, the latter, upon the positioning of said base, being cooperable with an undercut surface in one of the apertures of said support to lock the base against upward displacement, and another wedge operable to elevate said bolt, thereby to lock said base against endwise movement on said support.

Dated June 12, 1928.

EDWARD J. QUINN.